Patented Dec. 16, 1941

2,266,486

UNITED STATES PATENT OFFICE 2,266,486

PREPARATION OF ALUMINUM METAPHOSPHATE

Charles F. Booth, Anniston, Ala., assignor to Monsanto Chemical Company, a corporation of Delaware No Drawing. Application April 10, 1939, Serial No. 267,163

2 Claims. (Cl. 23—105)

This invention relates to the preparation of aluminum metaphosphate, $Al(PO_3)_3$.

Previously known methods for the preparation of aluminum metaphosphate consist in reacting together in solution, aluminum hydroxide $Al(OH)_3$ or other salts and an excess of orthophosphoric acid, followed by the evaporation of the resulting solution. After evaporation the residue is strongly heated.

Aluminum metaphosphate has also been prepared by the reaction of aluminum oxide, $Al_2O_3$, and metaphosphoric acid, however in order to effect a lowering of the melting point it is necessary to add to such reaction mixtures a small amount of silver phosphate, $Ag_3PO_4$.

When the reaction is carried out with relatively dilute phosphoric acid, say 75% $H_3PO_4$, and aluminum oxide or hydroxide, the reaction does not start until heat is applied and there is a marked tendency for the aluminum hydroxide to settle out of the mixture which adds to the difficulty of obtaining a reaction between these substances in the correct proportions to produce the metaphosphate which, when once formed, is insoluble.

When the reaction is carried out between the aluminum hydroxide and a stronger orthophosphoric acid, say an acid of 90 to 100% $H_3PO_4$ content, a reaction occurs immediately upon mixing with the result that effective mixing is hampered due to the immediate formation and precipitation of a product of improper composition. It is accordingly desirable for the production of a uniform product to delay the reaction between the acid and the hydroxide until such time as a uniform non-separable suspension is obtained by mechanical means and then to induce the reaction by means of heat. Acids of high strength such as metaphosphoric are therefore desirable as premature reaction is avoided. However in using acids of high strength, another difficulty due to the high viscosity of metaphosphoric acid is created. This difficulty is overcome by the following procedure.

I have now found that aluminum metaphosphate can be readily prepared by reacting together in stoichiometric proportions, aluminum hydroxide, or oxide or sulphate and tetraphosphoric acid, $H_6P_4O_{13}$. Such reaction is effected first by mixing together the aforesaid oxide or hydroxide which is normally in a dried, powdery form, and tetraphosphoric acid. The product resulting from such mixing is a semifluid of thick creamy consistency and may be converted to the metaphosphate by means of heat.

Tetraphosphoric acid, $H_6P_4O_{13}$, may be considered as a compound formed by the combination (or mixing together) of 2 mols of metaphosphoric acid, $HPO_3$, and 1 mol of pyrophosphoric acid, $H_4P_2O_7$. Some orthophosphoric acid, $H_3PO_4$ may also be present. For the present reaction the presence of the pyrophosphoric acid serves to lower the melting point of the reaction mixture so that effective mixing of the aluminum hydroxide or oxide may be obtained. As such it obviates the necessity for the introduction of a foreign substance, such as silver phosphate, into the product, for the purpose of lowering the melting point.

The following examples will illustrate my invention.

Mix together 31 pounds of $Al(OH)_3$ and 100 lbs. of tetraphosphoric acid. Heat to a temperature of 150° C. for 60 minutes or until bubbling ceases then continue heating, raising the temperature to 500° C. The heating operation is most conveniently carried out while the mass is contained in carbon crucibles.

Remove the product from the crucibles, grind in a ball mill in the presence of water, filter the insoluble aluminum metaphosphate upon a suction filter and finally dry in warm air.

The tetraphosphoric acid used should have a $P_2O_5$ content ranging between 82 and 84% $P_2O_5$. The proportions to be used may vary from 1 mol of $Al_2O_3$ to between 3.0 and 3.5 mols of $P_2O_5$ as tetraphosphoric acid.

The aluminum compound used may be either the oxide, the hydroxide or an aluminum oxide compound such as the chloride or sulphate.

The aluminum metaphosphate may be used as a flux or as an abrasive or polishing agent.

What I claim is:

1. The method of making aluminum metaphosphate comprising producing by mixing a uniform, non-separable suspension of a dry powdery aluminum oxide compound in tetraphosphoric acid, in the preportions of 1 mol of $Al_2O_3$ to between 3.0 and 3.5 mols of $P_2O_5$ as tetraphosphoric acid, heating said suspension at a temperature in the neighborhood of 150° C. until bubbling ceases, then further heating the material in the neighborhood of 500° C. to form said aluminum metaphosphate.

2. The method of making aluminum metaphosphate comprising producing, by mixing a uniform non-separable suspension of a dry powdery aluminum oxide compound in a phosphoric acid having a $P_2O_5$ content within the range of 82% to 84% $P_2O_5$, heating said suspension at a temperature in the neighborhood of 150° C. until bubbling of the mixture ceases, then further heating the material in the neighborhood of 500° C. to form said aluminum metaphosphate.

CHARLES F. BOOTH.